United States Patent
Seo et al.

(10) Patent No.: US 9,420,363 B2
(45) Date of Patent: Aug. 16, 2016

(54) DISPLAY DEVICE

(71) Applicant: SAMSUNG DISPLAY CO., LTD., Yongin, Gyeonggi-Do (KR)

(72) Inventors: Seung Mi Seo, Seoul (KR); Joon Hak Oh, Seoul (KR); Ha-Yun Kang, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 72 days.

(21) Appl. No.: 14/283,513

(22) Filed: May 21, 2014

(65) Prior Publication Data

US 2015/0078604 A1 Mar. 19, 2015

(30) Foreign Application Priority Data

Sep. 16, 2013 (KR) .................. 10-2013-0111086

(51) Int. Cl.
*H04R 1/02* (2006.01)
*G06F 3/01* (2006.01)
*G06F 1/16* (2006.01)
*G06F 3/02* (2006.01)
*H02J 7/00* (2006.01)
*H04R 17/00* (2006.01)

(52) U.S. Cl.
CPC .............. *H04R 1/028* (2013.01); *G06F 1/1635* (2013.01); *G06F 3/011* (2013.01); *G06F 3/016* (2013.01); *G06F 3/0202* (2013.01); *H02J 7/00* (2013.01); *H04R 17/00* (2013.01); *H04R 2499/15* (2013.01)

(58) Field of Classification Search
CPC .............................. H04R 5/02; H04R 2499/15
USPC ........................................................ 381/333
See application file for complete search history.

(56) References Cited

U.S. PATENT DOCUMENTS

| | | | |
|---|---|---|---|
| 8,150,091 B2 | 4/2012 | Eaton et al. | |
| 2002/0107044 A1 | 8/2002 | Kuwata et al. | |
| 2005/0129261 A1 | 6/2005 | Ito et al. | |
| 2007/0071259 A1* | 3/2007 | Tojo | G06F 1/1605 381/152 |
| 2007/0216670 A1* | 9/2007 | Yatsu | G09G 3/006 345/205 |
| 2011/0141046 A1* | 6/2011 | Sato | G06F 3/016 345/173 |

FOREIGN PATENT DOCUMENTS

| | | |
|---|---|---|
| JP | 2005033505 A | 2/2005 |
| JP | 2007189604 A | 7/2007 |
| JP | 2009100223 A | 5/2009 |
| JP | 4725469 B2 | 4/2011 |
| JP | 2011114589 A | 6/2011 |
| KR | 100510355 B1 | 8/2005 |
| KR | 100573729 B1 | 4/2006 |
| KR | 100863188 B1 | 10/2008 |
| KR | 100927115 B1 | 11/2009 |
| KR | 1020100005841 A | 1/2010 |
| KR | 101146530 B1 | 5/2012 |
| KR | 101159024 B1 | 6/2012 |

(Continued)

*Primary Examiner* — Simon King
(74) *Attorney, Agent, or Firm* — Cantor Colburn LLP

(57) ABSTRACT

A display device includes a display panel which displays an image, a cushion tape member which is disposed below the display panel to protect a rear surface of the display panel, and includes a first cushion tape and a second cushion tape, a sound element which is disposed between the first cushion tape and the second cushion tape, and includes a pair of electrodes and a vibrating material layer disposed between the pair of electrodes.

16 Claims, 19 Drawing Sheets

(56) References Cited

FOREIGN PATENT DOCUMENTS

| KR | 1020120081791 A | 7/2012 |
| KR | 1020130016976 A | 2/2013 |
| KR | 101293558 B1 | 7/2013 |
| KR | 101383702 B1 | 4/2014 |

* cited by examiner

DISPLAY DEVICE

This application claims priority to Korean Patent Application No. 10-2013-0111086 filed on Sep. 16, 2013, and all the benefits accruing therefrom under 35 U.S.C. §119, the entire contents of which are incorporated herein by reference.

BACKGROUND (a) Field

The invention relates to a display device, and more particularly to a display device which not only displays an image but also generates a sound or vibration.

(b) Description of the Related Art

A display device develops from a cathode ray tube ("CRT") method which uses a CRT of the related art and various flat panel displays such as a liquid crystal display ("LCD"), a plasma display panel ("PDP"), an organic light emitting display ("OLED"), an electrowetting display ("EWD"), an electrophoretic display ("EPD"), an embedded micro cavity display ("EMD"), or a nano crystal display ("NCD") have been developed.

Among the flat panel displays, the LCD which has been in the spotlight in recent years has advantages such as a reduced-size, light-weight, and low power consumption and draws attention as substitute for the CRT which may overcome a drawback of the CRT of the related art. For now, the LCD is mounted in almost all information processing equipment which requires the display device. The LCD generally includes an upper substrate in which a common electrode and a color filter are formed and a lower substrate in which a TFT and a pixel electrode are formed, and a liquid crystal material is injected between the two substrates. Different electric potentials are applied to the pixel electrode and the common electrode to form an electric field to change an arrangement of the liquid crystal molecules and adjust a transmittance of light therethrough to display an image.

In the LCD, a liquid crystal panel is a non-emissive element which does not emit light by itself so that a backlight unit which supplies light to the liquid crystal panel is provided below the liquid crystal panel.

Among the flat panel displays, an organic light emitting device has an advantage in that a light emitting diode ("LED") which emits light by itself is provided so that no backlight is used.

SUMMARY

Various flat panel displays have only a function of displaying an image so that a speaker needs to be additionally provided in order to provide a sound.

Further, a touch sensing display device is also widely used. However, a panel which includes a touch sensor is additionally provided in order to detect a touch or motion or a touch sensor is provided in the display device, which may require additional cost.

The invention has been made in an effort to provide a display device which is capable of generating a sound without providing a separate speaker or detecting a touch or motion without adding a separate touch panel/touch sensor.

In an exemplary embodiment, an exemplary embodiment of the invention provides a display device including a display panel which displays an image, a cushion tape which is disposed below the display panel to protect a rear surface of the display panel and includes a first cushion tape and a second cushion tape, and a sound element which is disposed between the first cushion tape and the second cushion tape and includes a pair of electrodes and a vibrating material layer disposed between the pair of electrodes.

In an exemplary embodiment, the sound element further comprises a supporting portion extended from one of the pair of electrodes, and the supporting portion may be disposed between the first cushion tape and the second cushion tape to support the sound element.

In an exemplary embodiment, grooves which provide resonators are defined in the first cushion tape and the second cushion tape, respectively, and the vibrating material layer of the sound element may be disposed in one of the resonators.

In an exemplary embodiment, the sound element may further include two or more vibrating material layers and the two or more vibrating material layers may be disposed in the one of the resonators.

In an exemplary embodiment, in the sound element, the one of the pair of electrodes which defines the supporting portion may be disposed below and commonly connected to the two or more vibrating material layers and the other of the pair of electrodes which does not define the supporting portion may be disposed on the two or more vibrating material layers so as to be electrically isolated therefrom.

In an exemplary embodiment, the first and second cushion tapes are adhesive members, and adhesive may be absent from the grooves so that the sound element may not be attached to the grooves.

In an exemplary embodiment, an opening may be defined in the first cushion tape or the second cushion tape, and the vibrating material layer of the sound element may be disposed in the opening and exposed by the opening in a plan view.

In an exemplary embodiment, the sound element may further include two or more vibrating material layers and the two or more vibrating material layers may be disposed in the opening and exposed by the opening in the plan view.

In an exemplary embodiment, the one of the pair of electrodes which defines the supporting portion may be disposed below and commonly connected to the two or more vibrating material layers and the other of the pair of electrodes which does not define the supporting portion may be disposed on the two or more vibrating material layers so as to be electrically isolated therefrom.

In an exemplary embodiment, a first electrode of the pair of electrodes is disposed below the vibrating material layer and a second electrode of the pair of electrodes is disposed above the vibrating material layer, and the first electrode which is disposed below the vibrating material layer may define an electrode pad which extends to the upper portion through a side of the vibrating material layer.

In an exemplary embodiment, the sound element may further include three vibrating material layers including first to third vibrating material layers and four electrodes including first to fourth electrodes, and each of the three vibrating material layers may be arranged between adjacent two electrodes of the four electrodes.

In an exemplary embodiment, the fourth electrode which is disposed under the third vibrating material layer may define an electrode pad which extends from a side thereof and is disposed on the first vibrating material layer.

In an exemplary embodiment, the first and third electrodes may be electrically connected to each other, the second and fourth electrodes are electrically connected to each other, the first vibrating material layer is disposed between the first and second electrodes, the second vibrating material layer is disposed between the second and third electrodes, and the third vibrating material layer is disposed between the third and fourth electrodes.

In an exemplary embodiment, the vibrating material layer of the sound element may generate vibration of a frequency other than an audio frequency, and a haptic function of the display device may detect change in the frequency other than the audio frequency to detect a touch of a user.

In an exemplary embodiment, the sound element may generate a voltage by an external pressure applied to the display device, and a pressure-detecting function of the display device evaluates the voltage to detect a pressure applied thereto.

In an exemplary embodiment, the display device may further include a microphone and the vibrating material layer of the sound element generates a sound wave of the frequency other than an audio frequency which is emitted from the sound element, and the sound wave may be modulated by the Doppler effect in accordance with a motion of a user, relative to the display device, and then a motion-sensing function of the display device inputs the Doppler effect-modulated sound wave to the microphone, and a change in the inputted Doppler effect-modulated sound wave is detected to detect the motion of the user.

In an exemplary embodiment, the display device may further include a battery which supplies a power to the display device, in which the sound element generates a voltage by an external pressure which is applied to the display device and vibrates the sound element, and a charging-function of the display device transmits the voltage generated by the sound element to the battery to charge the battery.

Another exemplary embodiment of the invention provides a display device including a display panel which displays an image, a rear chassis which accommodates the display panel to protect a rear surface of the display panel and includes a first protruding region which protrudes to the rear surface, a sound element which is disposed in the first protruding region and includes a pair of electrodes, and a vibrating material layer disposed between the pair of electrodes, and a supporting member which defined by one of the pair of electrodes and is disposed between the rear surface of the display panel and one surface of the sound element.

In an exemplary embodiment, the first protruding region may protrude by 80 percent (%) or more of a thickness of the rear chassis in a cross section, and a thickness of the sound element may be 50% or more and 70% or less of a protruding height of the first protruding region in the cross section.

In an exemplary embodiment, the thickness of the sound element may be 40% or more and 60% or less of the thickness of the rear chassis in the cross section.

As described above, a piezo material including a polyvinylidene fluoride ("PVDF") or a lead zirconate titanate ceramic ("PZT") to which an electric field is applied to provide a sound is provided so that the display device provides a sound. Further, vibration which is not an audio frequency is used so that when there is a touch of a user, a feedback therefor is received to detect the touch so that a separate touch screen may not be provided. Further, a movement of hands near the display device is detected by the Doppler effect so that a separate motion sensor may not be included.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
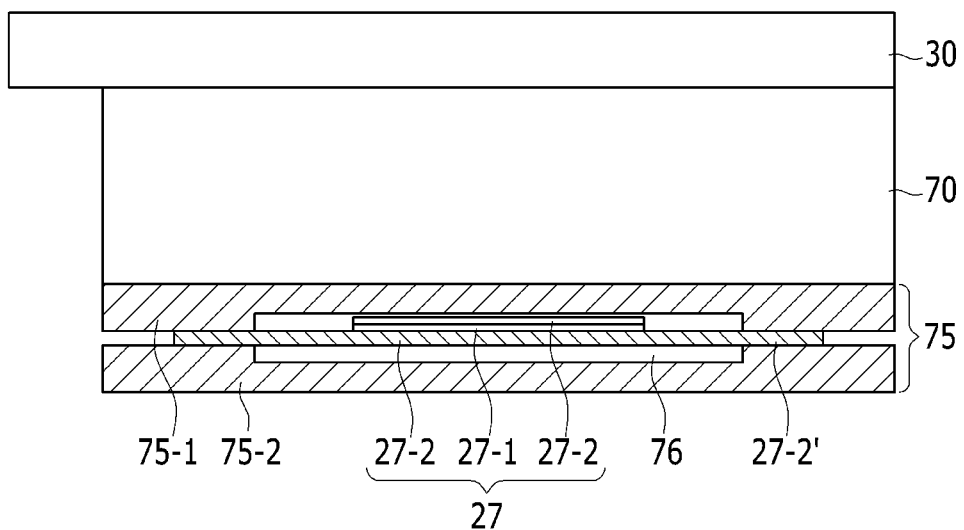
FIG. 1 is a cross-sectional view of an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Now, a display device according to an exemplary embodiment of the invention will be described in detail with reference to FIG. 1.

FIG. 1 is a cross-sectional view of a display device according to an exemplary embodiment of the invention.

A display device according to an exemplary embodiment of the invention includes a display panel 70, a window 30 which protects a front surface of the display panel 70, and a cushion tape 75 which protects a rear surface of the display panel 70 and includes a sound element 27 disposed therein.

In exemplary embodiments, the display panel 70 according to the exemplary embodiment of FIG. 1 may be a self-emitting display panel or a light receiving type display panel which receives light from a light source to display an image. An example of the self-emitting display panel includes an organic light emitting panel and an example of the light receiving type display panel includes a liquid crystal panel, for example. In an exemplary embodiment, the light receiving type display panel may include a backlight unit.

The display panel 70 includes a thin film transistor ("TFT") substrate which includes a plurality of TFTs. The TFT substrate is a transparent insulation substrate in which TFTs are disposed in a matrix and a data line is connected to a source terminal thereof and a gate line is connected to a gate terminal thereof. Further, a pixel electrode which includes a transparent indium tin oxide ("ITO") as a conductive material may be connected to a drain terminal. However, the invention is not limited thereto, and structures of the display panel 70 may vary depending on a type of the display panel and exemplary embodiments.

The display panel 70 of FIG. 1 may be a display panel assembly. That is, the display panel 70 of FIG. 1 is an assembly which includes a display panel and may further include a driving unit which includes an integrated circuit ("IC") chip and a flexible printed circuit board ("FPC") to drive the display panel in addition to the display panel.

A data line and a gate line of the display panel 70 are connected to the FPC. When an electric signal is input from the FPC to the data line and the gate line, the electric signal is transmitted to a source terminal and a gate terminal of the TFT and the TFT is turned on or off in accordance with a scanning signal which is applied to the gate terminal through the gate line so that an image signal which is applied to the source terminal through the data line is transmitted to a drain terminal or blocked. In an exemplary embodiment, the FPC receives a video signal from the outside of the display panel to apply driving signals to the data line and the gate line of the display panel.

The FPC generates an image signal and a scanning signal which drive the display device and a plurality of timing signals which applies the image signal and the scanning signal at an appropriate timing and applies the image signal and the scanning signal to the gate line and the data line of the display panel 70, respectively. Further, in the FPC according to the exemplary embodiment of the invention, an amplifier (not illustrated) which amplifies and transmits a sound signal may be provided. The amplifier receives and amplifies the sound signal which is transmitted from the outside and transmits the sound signal to a sound element 27 through a sound signal wiring line.

In the exemplary embodiment of FIG. 1, an organic light emitting panel will be mainly described as an example of the display panel 70. In the organic light emitting panel, an organic light emitting diode which is included in each pixel emits light so that a separate backlight unit is not required. As a result, the display panel 70 may be simply provided.

The front surface of the display panel 70 is protected by the window 30 and the rear surface of the display panel 70 is protected by the cushion tape 75.

First, the window 30 includes transparent glass or plastic so that a user may visibly recognize an image which is provided by the display panel 70, and the display panel 70 is protected from a scratch or impact from the outside. In an exemplary embodiment, the window 30 and the display panel 70 may be attached to each other by an adhesive, and the window 30 may have a larger area than the front surface of the display panel 70 and cover the entire front surface of the display panel 70. In an exemplary embodiment, other constituent element, such as a camera or a microphone, may be disposed in a region of the window 30 which does not correspond to the display panel 70. Therefore, various constituent elements are disposed therein in accordance with electronic equipment for which the display device is used.

The sound element 27 is disposed in the cushion tape 75 according to the exemplary embodiment of the invention.

The cushion tape 75 is divided into a first cushion tape 75-1 and a second cushion tape 75-2, and corresponding grooves are defined in the first cushion tape 75-1 and the second cushion tape 75-2, respectively. The corresponding grooves are spaces where the sound element 27 is disposed, and also provide a resonator 76 which reverberates a sound output from the sound element 27.

The sound element 27 is disposed between the first cushion tape 75-1 and the second cushion tape 75-2, and the first cushion tape 75-1 and the second cushion tape 75-2 are adhered a front surface and a rear surface of a supporting portion 27-2' of the sound element 27, respectively, so that the supporting portion 27-2' of the sound element 27 is fixed. In exemplary embodiments, the first cushion tape 75-1 and the second cushion tape 75-2 may be attached to the supporting portion 27-2' of the sound element 27 by the adhesive.

At least one surface of each of the first cushion tape 75-1 and the second cushion tape 75-2 includes an adhesive component so that the supporting portion 27-2' of the sound element 27 may be adhered by the first cushion tape 75-1 and the second cushion tape 75-2 to be fixed. In this case, an electrode 27-2 of the sound element 27 which is not connected to the supporting portion 27-2' is provided with a predetermined interval from the cushion tape 75 so as not to be attached to the cushion tape 75. Further, an adhesive component of a groove which provides the resonator 76 may be removed so that the electrode 27-2 of the sound element 27 is not attached even when the sound element 27 contacts the cushion tape while the sound element 27 vibrates.

The sound element 27 includes a pair of electrodes 27-2 and a vibrating material layer 27-1 disposed therebetween.

The vibrating material layer 27-1 includes a piezo material which vibrates by an electric field supplied from a pair of electrodes 27-2 which are disposed in a vertical direction and examples of the piezo material include polyvinylidene fluoride ("PVDF") or lead zirconate titanate ceramic ("PZT"), for example. The PVDF includes polyvinylidene fluoride trifluoroethylene ("PVDF-TrFE"), for example, which is easily manufactured to be a flexible film shape. In contrast, as compared with the PVDF, the PZT is harder to be manufactured to be a film shape so that the PZT is hard to have a flexible characteristic. However, in exemplary embodiments, while using the PZT as the vibrating material layer, the PZT and the PVDF (or PVDF-TrFE) are mixed to be used in order to provide a film shape.

The pair of electrodes 27-2 is disposed on both of the front surface and the rear surface of the vibrating material layer 27-1, respectively, and supply an electric field to the vibrating material layer 27-1. The electrode 27-2 may use various conductive materials such as a transparent conductor such as ITO or indium zinc oxide ("IZO"), an opaque metal, a conductive polymer, and a carbon nanotube ("CNT"). Further, one of the pair of electrodes 27-2 extends to define the supporting portion 27-2' at an end thereof. In the exemplary embodiment of FIG. 1, an electrode 27-2 which is disposed on the rear surface of the vibrating material layer 27-1 defines the supporting portion 27-2', but the invention is not limited thereto, and an electrode 27-2 which is disposed on a front surface of the vibrating material layer 27-1 may define the supporting portion 27-2'.

The sound element 27 according to the exemplary embodiment of the invention is supported by one electrode 27-2 which defines the supporting portion 27-2'. When the vibrating material layer 27-1 vibrates, the electrode 27-2 which defines the supporting portion 27-2' also vibrates.

The sound element 27 may be fixed without using a separate adhesive or the first cushion tape 75-1, and the second cushion tape 75-2 and the supporting portion 27-2' may be attached to each other using the adhesive.

Accordingly, when the sound element 27 is directly attached by the adhesive, a problem in that a characteristic of the vibrating material layer 27-1 is deteriorated during a process which applies heat to dry the adhesive may be removed. That is, no separate adhesive is used in order to fix the sound element 27 or even when the adhesive is used, the adhesive is used for the supporting portion 27-2' which is spaced apart from the vibrating material layer 27-1 and the heat is applied to the adhesive so that the characteristic of the vibrating material layer 27-1 is not deteriorated. As a result, according to the above fixing method, a quality of a sound which is supplied from the sound element 27 is improved.

The sound element 27 vibrates in the resonator 76 of the cushion tape 75. In exemplary embodiments, an opening is defined in the first cushion tape 75-1 or the second cushion tape 75-2 so as to transmit the sound in the resonator 76 to the outside so that the sound is easily emitted to the outside.

Hereinafter, a planar structure of the cushion tape 75 according to the exemplary embodiment of FIG. 1 will be described with reference to FIG. 2.

Figure 2:
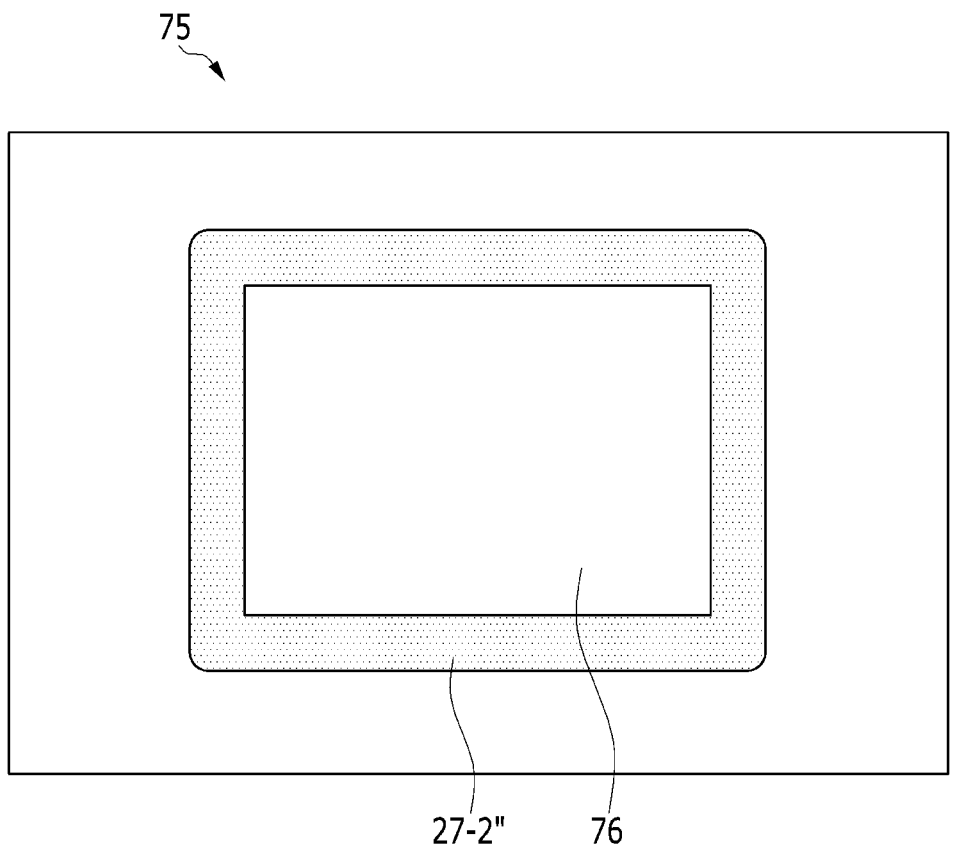
FIG. 2 is a top plan view of an exemplary embodiment of a cushion tape which is used for a display device according to the invention.

FIG. 2 is a top plan view of a cushion tape which is used for the display device according to the exemplary embodiment of the invention.

In FIG. 2, one of the first cushion tape 75-1 and the second cushion tape 75-2 which provide the cushion tape 75 is illustrated. Hereinafter, the first cushion tape 75-1 will be mainly described but the second cushion tape 75-2 has the same structure.

A groove which provides a part of the resonator 76 is defined in the first cushion tape 75-1, and a thickness of the first cushion tape 75-1 in a cross section where the groove is defined is smaller than a thickness of the first cushion tape 75-1 in the cross section where the groove is not defined.

The supporting portion 27-2' of the sound element 27 corresponds to a corresponding supporting portion 27-2" of the first cushion tape 75-1. The corresponding supporting portion 27-2" has a structure which encloses around the resonator 76. As a result, when the sound element 27 vibrates, the electrode 27-2 except the supporting portion 27-2' vibrates together with the vibrating material layer 27-1 to generate a sound.

Hereinafter, a planar structure of the sound element 27 according to the exemplary embodiment of FIG. 1 will be described with reference to FIG. 3.

Figure 3:
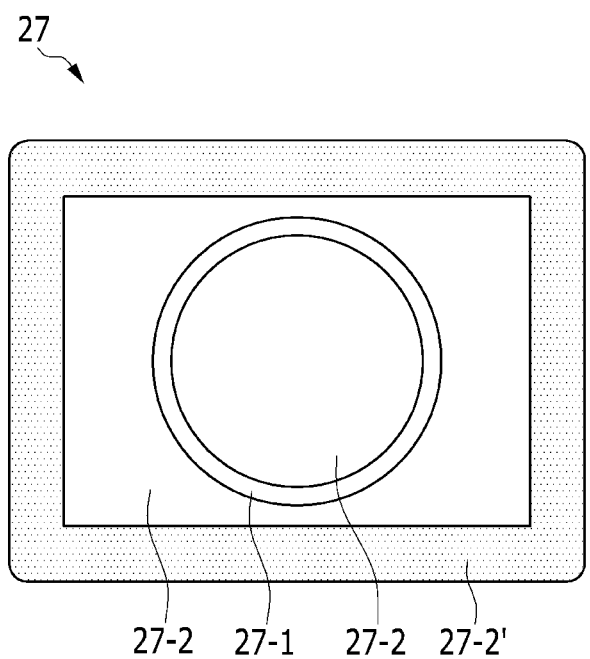
FIG. 3 is a top plan view of an exemplary embodiment of a sound element which is used for a display device according to the invention.

FIG. 3 is a top plan view of a sound element which is used for the display device according to the exemplary embodiment of the invention.

As illustrated in FIG. 3, the sound element 27 has the same outer peripheral structure as a structure of the corresponding supporting portion 27-2" of the cushion tape 75. This is because at an outer periphery of the sound element 27, the supporting portion 27-2' which corresponds to the corresponding supporting portion 27-2" of the cushion tape 75 is disposed.

The sound element 27 of FIG. 3 includes the electrode 27-2 in which the supporting portion 27-2' is provided, the vibrating material layer 27-1 which is disposed thereon so as to contact the electrode 27-2, and the electrode 27-2 which is disposed on the vibrating material layer 27-1 and has a size corresponding to a size of the vibrating material layer 27-1.

The sound element 27 is fixed by the supporting portion 27-2' which is disposed at the outer periphery of the electrode 27-2 so that a separate attaching process may not be required. Further, the electrode 27-2 in which the supporting portion 27-2' is provided entirely vibrates and the vibrating material layer 27-1 which is disposed on the electrode 27-2 and the electrode 27-2 which is disposed thereon also vibrate together.

Hereinafter, a display device which does not include the window 30 will be described with reference to an exemplary embodiment of FIG. 4.

Figure 4:
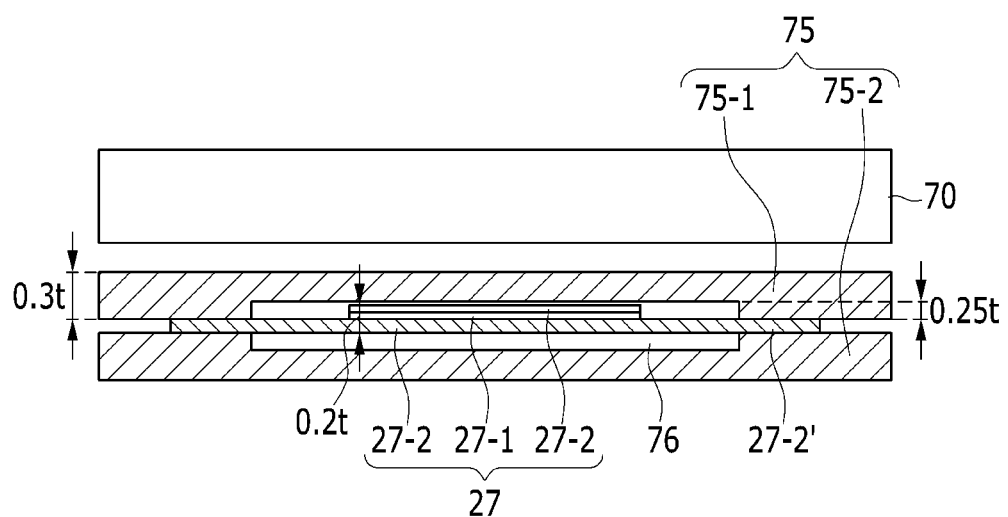
FIG. 4 is a cross-sectional view of another exemplary embodiment of a display device according to the invention.

FIG. 4 is a cross-sectional view of a display device according to another exemplary embodiment of the invention.

In another display device according to an exemplary embodiment of FIG. 4, the window 30 is not disposed on a front surface of a display panel 70, which is different from the exemplary embodiment of FIG. 1.

The display device according to the exemplary embodiment of FIG. 4 includes the display panel 70 and a cushion tape 75 which protects a rear surface of the display panel 70 and includes a sound element 27 disposed therein.

In an exemplary embodiment, the display panel 70 according to the exemplary embodiment of FIG. 4 may be a self-emitting display panel or a non-emissive display panel which receives the light from a light source to display an image. An example of the self-emitting display panel includes an organic light emitting panel and an example of the non-emissive display panel includes a liquid crystal panel, for example. In an exemplary embodiment, the non-emissive display panel may include a backlight unit.

In an exemplary embodiment, the display panel 70 of FIG. 4 may be a display panel assembly. That is, the display panel 70 of FIG. 4 is an assembly which includes a display panel and may further include a driving unit which includes an IC and an FPC to drive the display panel in addition to the display panel.

A data line and a gate line of the display panel 70 are connected to the FPC. When an electric signal is input from the FPC to the data line and the gate line, the electric signal is transmitted to a source terminal and a gate terminal of the TFT and the TFT is turned on or turned off in accordance with a scanning signal which is applied to the gate terminal through the gate line so that an image signal which is applied to the source terminal through the data line is transmitted to a drain terminal or blocked. In an exemplary embodiment, the FPC receives a video signal from the outside of the display panel to apply driving signals to the data line and the gate line of the display panel.

The FPC generates an image signal and a scanning signal which drive the display device and a plurality of timing signals which applies the image signal and the scanning signal at an appropriate timing and applies the image signal and the scanning signal to the gate line and the data line of the display panel 70, respectively. Further, in the FPC according to the exemplary embodiment of the invention, an amplifier (not illustrated) which amplifies and transmits a sound signal may be provided. The amplifier receives and amplifies the sound signal which is transmitted from the outside and transmits the sound signal to a sound element 27 through a sound signal wiring line.

In the exemplary embodiment of FIG. 4, an organic light emitting panel will be mainly described as an example of the display panel 70. In the organic light emitting panel, an organic light emitting diode which is included in each pixel emits light so that a separate backlight unit is not required. As a result, the display panel 70 may be simply provided.

The rear surface of the display panel 70 is protected by the cushion tape and the sound element 27 is disposed in the cushion tape 75.

The cushion tape 75 is divided into a first cushion tape 75-1 and a second cushion tape 75-2 and corresponding grooves are defined in the first cushion tape 75-1 and the second cushion tape 75-2, respectively. The corresponding grooves are spaces where the sound element 27 is disposed and also provide a resonator 76 which reverberates a sound output from the sound element 27.

The sound element 27 is disposed between the first cushion tape 75-1 and the second cushion tape 75-2, and the first cushion tape 75-1 and the second cushion tape 75-2 are adhered to a front surface and a rear surface of a supporting portion 27-2' of the sound element 27 so that the supporting portion 27-2' of the sound element 27 is fixed. In exemplary embodiments, the first cushion tape 75-1 and the second cushion tape 75-2 may be attached to the supporting portion 27-2' of the sound element 27 by the adhesive.

The sound element 27 includes a pair of electrodes 27-2 and a vibrating material layer 27-1 which is disposed therebetween.

In an exemplary embodiment, the vibrating material layer 27-1 includes a piezo material which vibrates by an electric field supplied from a pair of electrodes 27-2 which are disposed in a vertical direction and examples of the piezo material include PVDF or PZT, for example. The PVDF includes PVDF-TrFE, which is easily manufactured to be a flexible film shape. In contrast, as compared with the PVDF, the PZT is harder to be manufactured to be a film shape so that the PZT is hard to have a flexible characteristic. However, in exemplary embodiments, while using the PZT as the vibrating material layer, the PZT and the PVDF (or PVDF-TrFE) are mixed to be used in order to provide a film shape.

The pair of electrodes 27-2 is disposed at both of a front surface and a rear surface of the vibrating material layer 27-1, respectively, and supply an electric field to the vibrating material layer 27-1. In an exemplary embodiment, the electrode 27-2 may use various conductive materials such as a transparent conductor such as ITO or IZO, an opaque metal, a conductive polymer, and a CNT. In an exemplary embodiment, one of the pair of electrodes 27-2 extends to have the supporting portion 27-2' at an end thereof. In the exemplary embodiment of FIG. 4, an electrode 27-2 which is disposed on the rear surface of the vibrating material layer 27-1 has the supporting portion 27-2', but an electrode 27-2 which is disposed on the front surface the vibrating material layer 27-1 may not have the supporting portion 27-2'.

The sound element 27 according to the exemplary embodiment of the invention is supported by one electrode 27-2 which includes the supporting portion 27-2'. When the vibrating material layer 27-1 vibrates, the electrode 27-2 which includes the supporting portion 27-2' also vibrates.

In an exemplary embodiment, the sound element 27 may be fixed without using a separate adhesive or the first cushion tape 75-1, and the second cushion tape 75-2 and the supporting portion 27-2' may be attached to each other using the adhesive.

Accordingly, a problem in that a characteristic of the vibrating material layer 27-1 is deteriorated during a process which applies heat to dry the adhesive when the sound element 27 is directly attached by the adhesive may be removed. That is, in the exemplary embodiment, the sound element 27 is fixed without a separate adhesive, or even when the adhesive is used, the adhesive is used only for the supporting portion 27-2' which is spaced apart from the vibrating material layer 27-1 and the heat is applied to the adhesive so that the characteristic of the vibrating material layer 27-1 is not deteriorated. As a result, according to the above fixing method, a quality of a sound which is supplied from the sound element 27 is improved.

The sound element 27 vibrates in the resonator 76 of the cushion tape 75. In exemplary embodiments, an opening is defined in the first cushion tape 75-1 or the second cushion tape 75-2 so as to transmit the sound in the resonator 76 to the outside so that the sound is easily emitted to the outside.

FIG. 4 illustrates a thickness of the cushion tape 75. According to the exemplary embodiment of FIG. 4, a thickness of the first cushion tape 75-1 or the second cushion tape 75-2 in a cross section is 0.3t, e.g., 0.3 millimeters (mm) when t is equal to 1, and a thickness of the groove which provides a part of the resonator 76 is 0.25t (e.g., 0.25 mm), and a thickness of the sound element 27 is 0.2t (e.g., 0.2 mm) Therefore, the thinnest portion of the first cushion tape 75-1 or the second cushion tape 75-2 has a thickness of 0.05 mm and the resonator 76 has a thickness of at least 0.5 mm. The thicknesses and a ratio of the thicknesses of the portions may vary depending on other exemplary embodiments.

That is, in the display device according to the exemplary embodiment of the invention, the thickness of the groove which is defined in the cushion tape in a cross section is 80% or more of the cushion tape thickness. Further, the thickness of the sound element is 50% or more and 70% or less of the thickness of the cushion tape.

Hereinafter, a display device according to another exemplary embodiment of the invention will be described with reference to FIG. 5.

Figure 5:
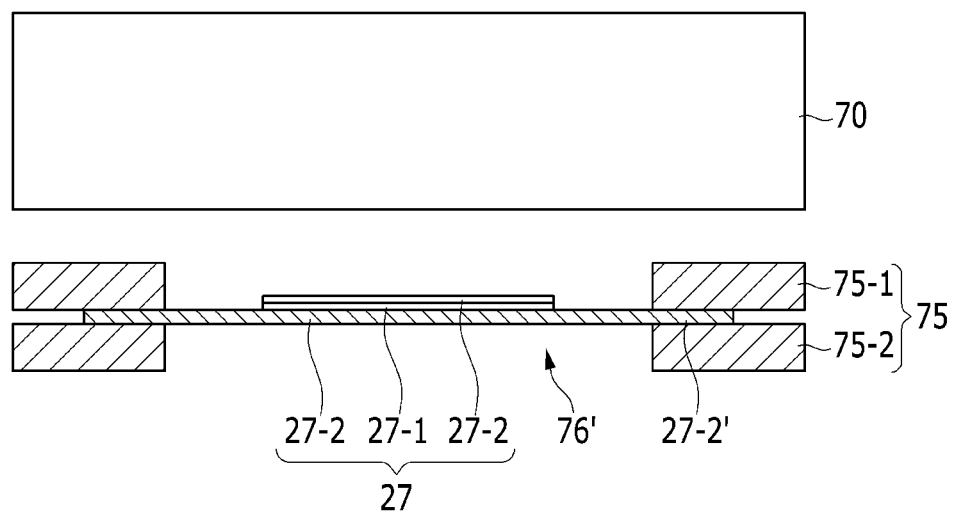
FIG. 5 is a cross-sectional view of another exemplary embodiment of a display device according to the invention.

FIG. 5 is a cross-sectional view of a display device according to another exemplary embodiment of the invention.

In the exemplary embodiment of FIG. 5, a cushion tape 75 has a structure through which a sound element 27 is exposed in a plan view, which is different from the exemplary embodiments of FIGS. 1 and 4.

That is, the exemplary embodiment of FIG. 5, the resonator is provided by an opening 76' instead of the resonator 76 of FIGS. 1 and 4.

According to the exemplary embodiment of FIG. 5, a sound which is emitted from the sound element 27 is easily transmitted to the outside through the opening 76'.

In the exemplary embodiment of FIG. 5, openings instead of grooves are defined in the first cushion tape 75-1 and the second cushion tape 75-2. However, in exemplary embodiments, an opening may be defined in one of the first cushion tape 75-1 and the second cushion tape 75-2 and a groove may be defined in the other one. In this case, a groove may be defined in the first cushion tape 75-1 which is close to the display panel 70 and an opening may be defined in the second cushion tape 75-2, or vice versa in exemplary embodiments.

The exemplary embodiment in which one sound element 27 is provided has been described above.

Hereinafter, an exemplary embodiment in which a plurality of sound elements 27 is provided will be described with reference to FIG. 6.

Figure 6:
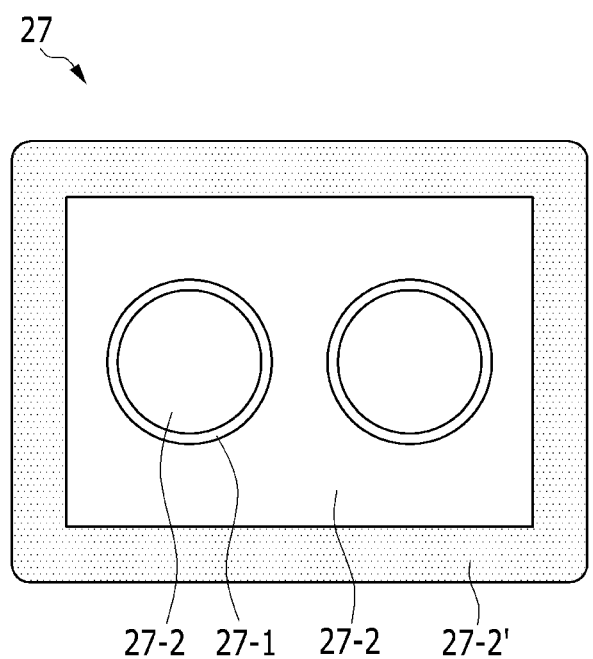
FIG. 6 is a top plan view of another exemplary embodiment of a sound element which is used for a display device according to the invention.

FIG. 6 is a top plan view of a sound element which is used for a display device according to another exemplary embodiment of the invention.

FIG. 6 illustrates an exemplary embodiment in which two sound elements 27 are provided.

The two sound elements 27 which are illustrated in FIG. 6 are not separated from each other but share one electrode 27-2 and one supporting portion 27-2'.

That is, the two sound elements 27 share a lower electrode 27-2 and upper electrodes 27-2, and vibrating material layers 27-1 are divided.

Even though the two vibrating material layers 27-1 share the lower electrode 27-2, but the upper electrodes 27-2 supplies different signals to generate different vibration and generate sound in stereo.

In exemplary embodiments, the lower electrodes 27-2 may be electrically separated from each other and the number of the sound elements 27 may vary when necessary.

The sound element 27 is fixed by the supporting portion 27-2' which is disposed at the outer periphery of the electrode 27-2 so that a separate attaching process may not be required. Further, the electrode 27-2 in which the supporting portion 27-2' is provided entirely vibrates and the vibrating material layer 27-1 which is disposed on the electrode 27-2 and the electrode 27-2 which is disposed thereon also vibrate together.

Hereinafter, a display device according to another exemplary embodiment of the invention will be described with reference to FIGS. 7 and 8.

Figure 7:
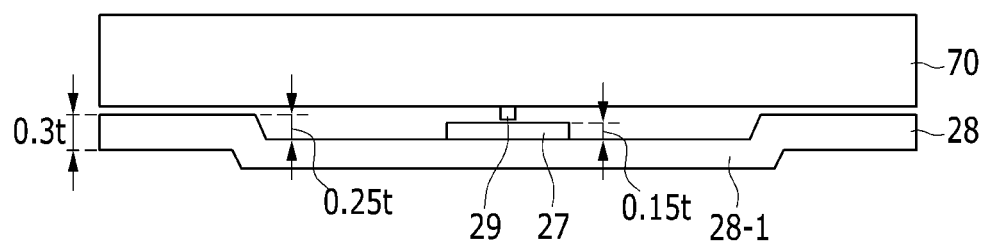
FIG. 7 is a cross-sectional view of another exemplary embodiment of a display device according to the invention.
Figure 8:
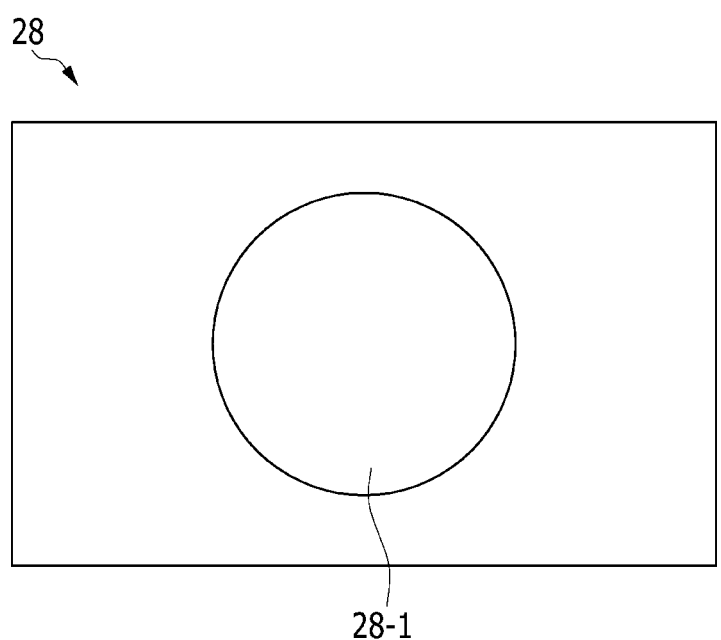
FIG. 8 is a top plan view of another exemplary embodiment of a rear chassis which is used for a display device according to the invention.

FIG. 7 is a cross-sectional view of a display device according to another exemplary embodiment of the invention and FIG. 8 is a top plan view of a rear chassis which is used for a display device according to another exemplary embodiment of the invention.

A display device according to an exemplary embodiment of FIG. 7 includes a display panel 70, a rear chassis 28 which accommodates the display panel 70, protects a rear surface of the display panel 70 and has a protruding region 28-1, and a sound element 27 which is disposed in and/or on the protruding region 28-1.

In an exemplary embodiment, the display panel 70 according to the exemplary embodiment of FIG. 7 may be a self-emitting display panel or a non-emissive display panel which receives light from a light source to display an image. An example of the self-emitting display panel includes an organic light emitting panel and an example of the non-emissive display panel includes a liquid crystal panel, for example. In an exemplary embodiment, the non-emissive display panel may include a backlight unit.

The display panel 70 includes a TFT substrate which includes a plurality of TFTs. In an exemplary embodiment, the TFT substrate is a transparent insulation substrate in which TFTs are disposed in a matrix and a data line is connected to a source terminal thereof and a gate line is connected to a gate terminal thereof. In an exemplary embodiment, a pixel electrode which includes a transparent ITO, for example, as a conductive material may be connected to a drain terminal. Detailed structures of the display panel 70 may vary depending on a type of the display panel and exemplary embodiments.

In an exemplary embodiment, the display panel 70 of FIG. 7 may be a display panel assembly. That is, the display panel 70 of FIG. 7 is an assembly which includes a display panel and may further include a driving unit which includes an IC chip and an FPC to drive the display panel in addition to the display panel.

A data line and a gate line of the display panel 70 are connected to the FPC. When an electric signal is input from the FPC to the data line and the gate line, the electric signal is transmitted to a source terminal and a gate terminal of the TFT and the TFT is turned on or turned off in accordance with a scanning signal which is applied to the gate terminal through the gate line so that an image signal which is applied to the source terminal through the data line is transmitted to a drain terminal or blocked. In an exemplary embodiment, the FPC receives a video signal from the outside of the display panel to apply driving signals to the data line and the gate line of the display panel, respectively.

The FPC generates an image signal and a scanning signal which drive the display device and a plurality of timing signals which applies the image signal and the scanning signal at an appropriate timing and applies the image signal and the scanning signal to the gate line and the data line of the display panel 70, respectively. In an exemplary embodiment, in the FPC according to the exemplary embodiment of the invention, an amplifier (not illustrated) which amplifies and transmits a sound signal may be provided. The amplifier receives and amplifies the sound signal which is transmitted from the outside and transmits the sound signal to a sound element 27 through a sound signal wiring line.

In an exemplary embodiment, the display panel 70 may further include a mold frame and may be fixed by the mold frame. In an exemplary embodiment, the display panel 70 may further include a top chassis in order to effectively prevent the display panel 70 from being deviated to a front direction.

Hereinafter, an example in which the display panel 70 is a liquid crystal panel will be mainly described and the display panel 70 includes the backlight unit.

The rear chassis 28 is included in order to protect a rear surface of the above-described display panel 70. The rear chassis 28 may be also referred to as a bottom chassis or a back chassis. The rear chassis 28 is disposed on a rear surface of the display panel 70 to accommodate and protect the display panel 70. Such a rear chassis 28 is coupled to the mold frame or the top chassis of the display panel 70 to protect the display panel 70 in exemplary embodiments.

The rear chassis 28 according to the exemplary embodiment of the invention includes a protruding region 28-1 which protrudes in a rear direction. Referring to FIG. 8, the protruding region 28-1 has a circular shape, for example.

In the exemplary embodiment of FIG. 7, a thickness of the rear chassis 28 and a protruding height of the protruding region 28-1 are represented by numerical values. First, a thickness of the rear chassis 28 in a cross section is 0.3t, e.g., 0.3 mm when t is equal to 1 mm, and the protruding region 28-1 protrudes by 0.25t (0.25 mm). Further, a thickness of the sound element 27 which is disposed in the protruding region 28-1 is 0.15t (0.15 mm). The numerical values may vary depending on the exemplary embodiment and a ratio of the numerical values may be constant.

That is, in the display device according to the exemplary embodiment of the invention, the protruding region 28-1 protrudes by a value which is about 80% or more of the thickness of the rear chassis 28 and the thickness of the sound element 27 is about 50% or more and about 70% or less of the protruding height of the protruding region 28-1. Further, the thickness of the sound element 27 is about 40% or more and about 60% or less of the thickness of the rear chassis 28.

The protruding region 28-1 is a region where the sound element 27 is disposed and may function as a resonator which amplifies a sound supplied from the sound element 27.

The sound element 27 is disposed inside the protruding region 28-1 of the rear chassis 28 and the sound element 27 is fixed by a supporting member 29. In the illustrated exemplary embodiment, the sound element 27 is disposed on a part of a front surface of the protruding region 28-1 of the rear chassis 28. The sound element 27 vibrates in order to generate a sound so that a position of the sound element 27 in a space of the protruding region 28-1 may move. In order to effectively prevent the position from moving, the supporting member 29 is disposed on one surface of the sound element 27 and a rear surface of the display panel 70 so as not to move the sound element 27 by the vibration, in the exemplary embodiment of the invention. In the illustrated exemplary embodiment, the supporting member 29 is disposed on a front surface of the sound element 27.

In an exemplary embodiment, the sound element 27 is not attached by a separate adhesive so that such a structure may be easily manufactured. When an adhesive is used, heat needs to be applied in order to cure an adhesive and thus a characteristic of the sound element 27 may be deteriorated by the heat. Therefore, when the supporting member 29 is used to fix the sound element, the above-mentioned drawback may be effectively reduced.

The sound element 27 includes a pair of electrodes 27-2 and a vibrating material layer 27-1 disposed therebetween (refers to FIG. 1). The vibrating material layer 27-1 includes a piezo material which vibrates by an electric field supplied from a pair of electrodes 27-2 which are disposed in a vertical direction and examples of the piezo material include poly vinylidene fluoride ("PVDF") or PZT.

The PVDF includes PVDF-TrFE, which is easily manufactured to be a flexible film shape. In contrast, as compared with the PVDF, the PZT is harder to be manufactured to be a film shape so that the PZT is hard to have a flexible characteristic. However, in exemplary embodiments, while using the PZT as the vibrating material layer, the PZT and the PVDF (or PVDF-TrFE) are mixed to be used in order to provide a film shape.

The pair of electrodes 27-2 are disposed at both sides of the vibrating material layer 27-1, respectively and supply an electric field to the vibrating material layer 27-1. The electrode 27-2 may use various conductive materials such as a transparent conductor such as ITO or IZO, an opaque metal, a conductive polymer, and a CNT.

Hereinafter, when the supporting member 29 is used similarly to the exemplary embodiment of FIG. 7, a difference in waveforms which are generated in the sound element 27 will be described with reference to FIGS. 9 and 10.

Figure 9:
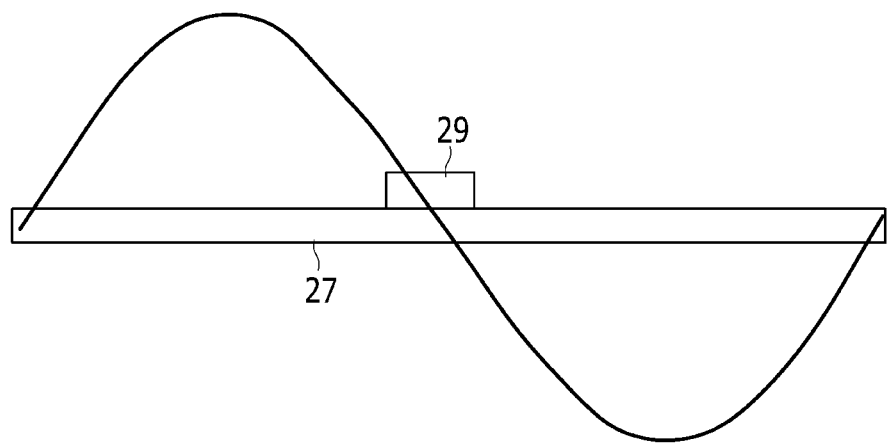
FIGS. 9 and 10 are diagrams illustrating vibration of the sound element.
Figure 10:
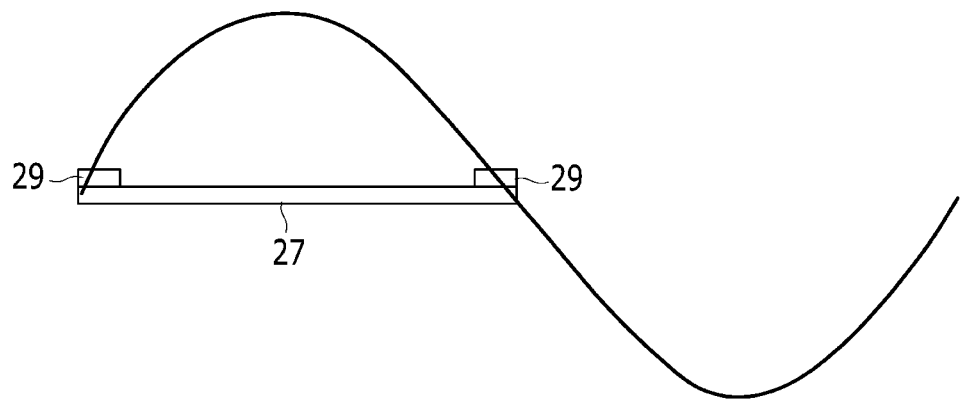

FIGS. 9 and 10 are diagrams illustrating vibration of the sound element.

First, in FIG. 9, the supporting member 29 is disposed at a center of the sound element 27, like FIG. 7.

A portion of the sound element 27 which contacts the supporting member 29 is fixed so as not to vibrate in a vertical direction. Therefore, as illustrated in FIG. 9, the sound element 27 vibrates in the vertical direction with respect to the supporting member 29.

In the exemplary embodiment, it is assumed that a waveform having the largest wavelength which may be generated by the sound element 27, which is an entire vibration length of the sound element 27, is one wavelength as illustrated in FIG. 9.

In the exemplary embodiment of FIG. 10, like the exemplary embodiments of FIGS. 1, 4 and 5, both ends of the sound element 27 are fixed. Even though the both ends of the sound element 27 are fixed using the supporting member 29 in FIG. 10, the same characteristic may be obtained when both ends are fixed between the cushion tapes like the exemplary embodiments of FIGS. 1, 4, and 5.

The sound element 27 of which both ends are fixed as illustrated in FIG. 10, vibrates with the waveform as illustrated in FIG. 10. That is, it is assumed that a waveform having the largest wavelength which may be generated by the sound element 27 of the exemplary embodiment of FIG. 10 is twice of the entire vibration length of the sound element 27 illustrated in FIG. 9.

As a result, it is understood that the structure of FIG. 10 may generate a waveform having a larger wavelength than that of the structure of FIG. 9 and the sound is also different from that of FIG. 9.

FIGS. 9 and 10 show that the generated wavelength varies depending on which part of the sound element 27 is fixed and thus a characteristic of the sound accordingly varies. Therefore, it is understood that various exemplary embodiments showing which part of the sound element 27 is fixed depending on a kind of a sound which is generated by the display device may be provided.

Hereinafter, modification embodiments of the sound element 27 will be described with reference to FIGS. 11 to 14.

FIGS. 11 to 14 are diagrams illustrating configurations of various sound elements according to an exemplary embodiment of the invention.

First, a sound element 27 of FIG. 11 will be described.

Figure 11:
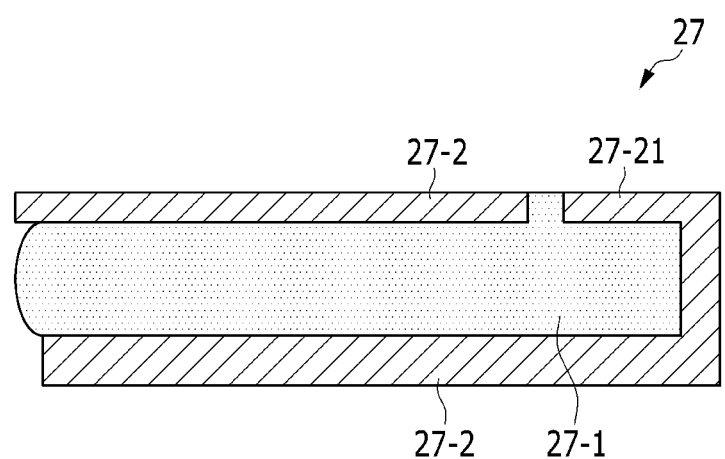
FIGS. 11 to 14 are diagrams illustrating exemplary embodiments of configurations of various sound elements according to the invention.

FIG. 11 illustrates a cross-section of a part of the sound element 27 and the sound element 27 includes a pair of electrodes 27-2 and a vibrating material layer 27-1 disposed therebetween. The vibrating material layer 27-1 includes a piezo material which vibrates by an electric field supplied from the pair of electrodes 27-2 which are disposed in a vertical direction and examples of the piezo material include PVDF or PZT.

One electrode 27-2 is disposed at an upper portion and the other one electrode 27-2 is disposed at a lower portion with respect to a vibrating material layer 27-1. In the exemplary embodiment of FIG. 11, a part 27-21 of the electrode which is disposed at the lower portion climbs a side of the vibrating material layer 27-1 so as to be disposed above a part of the vibrating material layer 27-1. The part which is disposed above the part of the vibrating material layer 27-1 provides an electrode pad 27-21. A wiring line needs to be connected to the two electrodes 27-2 in order to apply an electric field to the vibrating material layer 27-1. In this case, as illustrated in FIG. 11, when the electrode pad 27-21 of the lower electrode 27-2 is disposed at an upper portion, two electrodes may be directly connected at the upper portion. As a result, even though the lower portion of the sound element 27 is attached by an adhesive, a signal may be applied through the upper portion.

Figure 12:
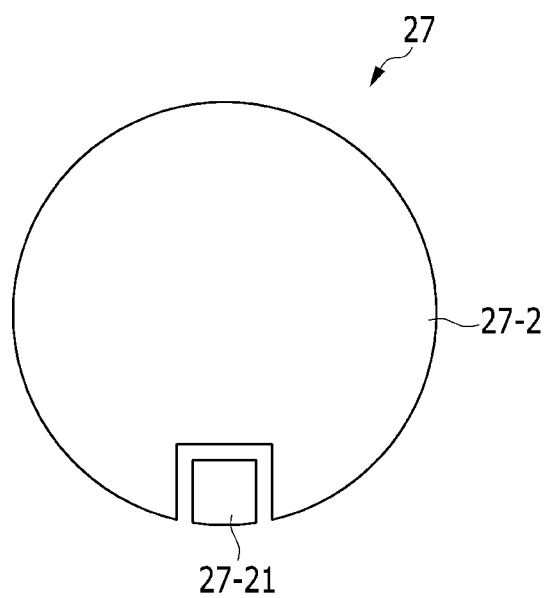

A plan view of the sound element 27 illustrated in FIG. 11 seen from the upper portion is illustrated in FIG. 12. The electrode 27-2 which is disposed at the upper portion occupies the most region and the electrode pad 27-21 of the lower electrode 27-2 is disposed only in a partial region and the electrode pad 27-21 is spaced apart from the upper electrode 27-2 with a predetermined interval. In the exemplary embodiment of FIG. 12, the electrode pad 27-21 has a quadrangular shape and the upper electrode 27-2 is disposed in a remaining portion of the circle except for the electrode pad 27-21. The vibrating material layer 27-1 which is disposed therebelow has a circular structure and the lower electrode 27-2 also has a circular structure. The lower electrode 27-2 is connected to the electrode pad 27-21 along a side of the vibrating material layer 27-1.

As described above, the sound element 27 basically has a pair of upper and lower electrodes 27-2 but in exemplary embodiments, one of the electrodes may be changed to another structure.

Figure 13:
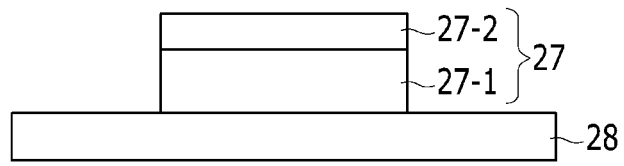

Referring to FIG. 13, the sound element 27 includes one upper electrode 27-2 and the vibrating material layer 27-1 disposed therebelow. The rear chassis 28 is disposed below the vibrating material layer 27-1. In an exemplary embodiment, the rear chassis 28 includes a conductive material and in this case, the rear chassis 28 and the upper electrode 27-2 are provided as a pair of electrodes to supply an electric field to the vibrating material layer 27-1. That is, in the exemplary embodiment of FIG. 13, when a constituent element to which the sound element 27 is attached includes a conductive material, one of the electrodes is not provided and the constituent element (the rear chassis 28 in FIG. 13) is used to be provided as an electrode. In this case, it is desirable that like the rear chassis 28, a constituent element with which the electrode is replaced does not receive other electric signals than a signal from the amplifier.

In the exemplary embodiment of FIG. 13, the rear chassis 28 which functions as the lower electrode is much wider than the sound element 27 so that lots of positions to which a wire is connected are provided. Therefore, as illustrated in FIGS. 11 and 12, the electrode pad 27-21 which is disposed at an upper portion along the side of the vibrating material layer 27-1 may not be separately provided.

Hereinafter, a multi-layered sound element 27 will be described with reference to FIG. 14.

Figure 14:
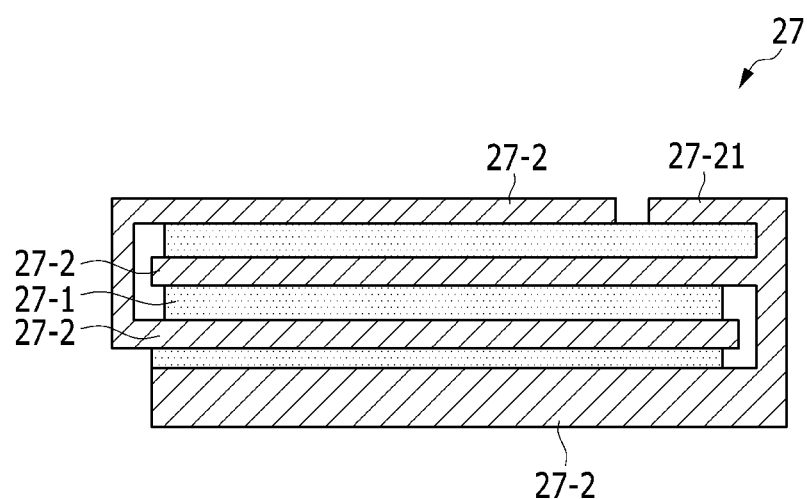

A sound element 27 according to an exemplary embodiment of FIG. 14 includes three vibrating material layers 27-1 and a total of four electrodes 27-2. Three vibrating material layers 27-1 including first to third vibrating material layers 27-1 are arranged in a triple layered structure and a total of four electrodes 27-2 including a first to fourth electrodes 27-2 are disposed on an outermost side of the vibrating material layer 27-1 having the triple layered structure, and each of the three vibrating material layers 27-1 are disposed between adjacent two electrodes of the four electrodes 27-2. The total of four electrodes are electrically connected two by two and alternately disposed to each other. Specifically, different signals are applied to a fourth electrode 27-2 (also referred to as a bottom electrode) and a first electrode 27-2 (also referred to as a top electrode), and second and third electrodes 27-2 (also referred to as middle electrodes) are respectively connected to the fourth electrode 27-2 and the first electrode 27-2 along sides thereof. The fourth electrode 27-2 allows the electrode pad 27-21 to be disposed next to the first electrode 27-2 so that the wiring line is easily connected thereto. As a result, the electrodes 27-2 which contact the vibrating material layer 27-1 in the vertical direction apply different signals so that a sound is generated while vibrating the vibrating material layer 27-1 by an electric field generated by applying the different signals. In the exemplary embodiment of FIG. 14, three vibrating material layers 27-1 are provided so that a sound pressure which is higher than that of a sound element 27 which includes only one vibrating material layer may be generated.

Hereinafter, an exemplary embodiment which is used as another method in addition to a method of providing a sound to the user using the sound element 27 will be described.

FIGS. 15 to 19 are diagrams illustrating a driving characteristic which may be used by a display device according to an exemplary embodiment of the invention.

Figure 15:
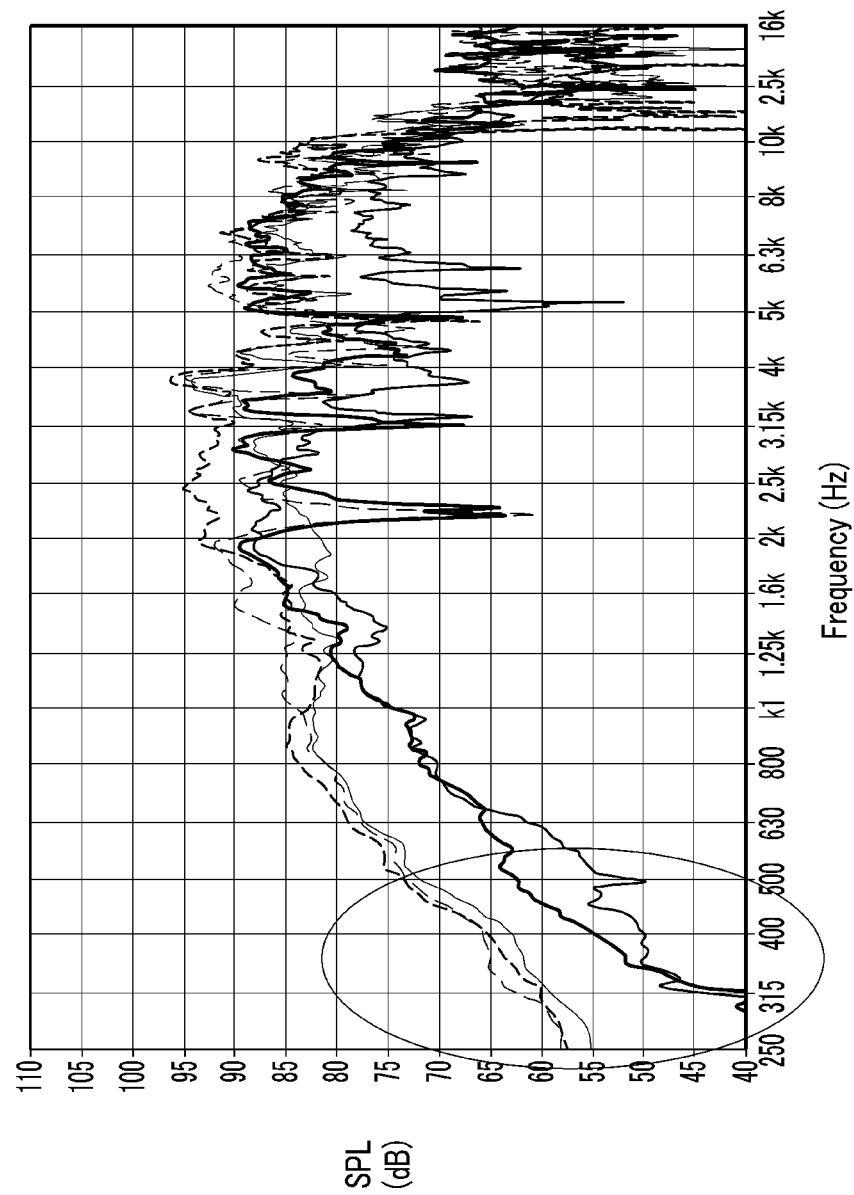
FIGS. 15 and 16 are diagrams illustrating an exemplary embodiment of an amplifier of a display device according to the invention.

FIG. 15 is a graph illustrating a sound pressure level ("SPL") measured in decibels (dB) in y-axis versus a frequency measured in hertz (Hz) in x-axis. In FIG. 15, it is checked that a haptic function of the display device may be used by using a frequency (e.g., about 250 Hz to about 600 Hz) which is not an audio frequency among vibration of the sound element 27.

Vibration is generally generated in the display device by the sound element 27 and low vibration which is not the audio frequency is also generated as illustrated in FIG. 15. A user cannot hear the frequency so that even when the frequency is used for another purpose, a sound quality is not affected. Vibration which is changed when the user touches the display device is detected so that the touch is detected. The detection of the touch may be detection of the presence of touch and may be used together with a haptic function in exemplary embodiments. That is, vibration other than the audio frequency which is provided by the sound element 27 is used to detect the change to confirm whether there is touch from the user to implement the haptic function. To this end, a sensor which detects vibration of a low frequency which is not the audio frequency may be further provided, and a signal controller which displays an image in the display device or a control unit, e.g., microprocessor unit ("MPU"), of a portable terminal may implement the haptic function using the sensor.

Figure 16:
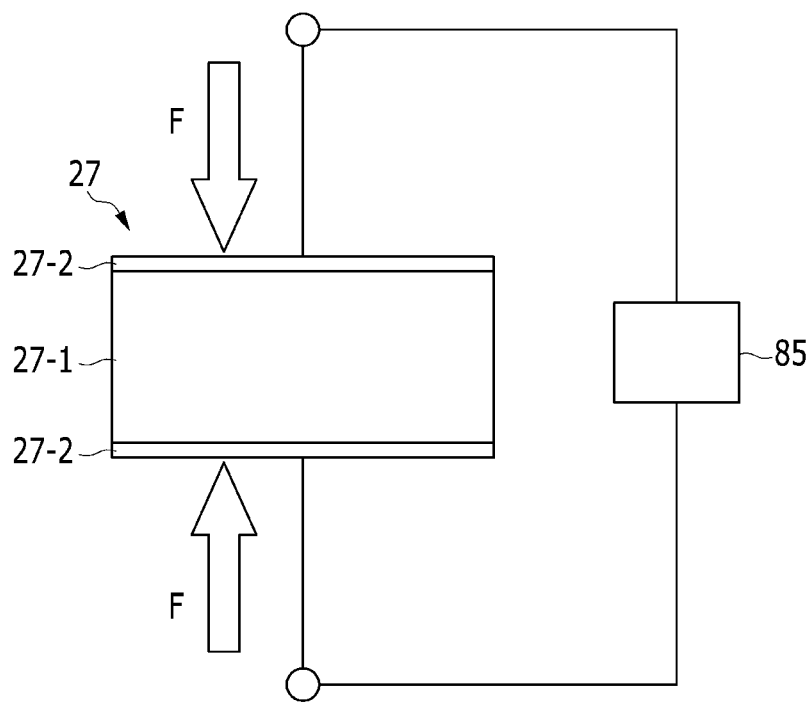

Hereinafter, a role as a pressure detecting sensor will be described with reference to FIG. 16.

A vibrating material layer 27-1 which is included in the sound element 27 generates a sound while vibrating by an electric field. However, when the vibrating material layer 27-1 vibrates without using the electric field, a voltage is generated from the vibrating material layer 27-1. When the generated voltage is detected, it is checked that displacement of the vibrating material layer 27-1 is generated. It is also checked that the vibrating material layer is pressed by a pressure F so that displacement is generated and thus the vibrating material layer 27-1 may perform a pressure detecting function.

In order to detect a pressure using the sound element 27, a sensor 85 which detects a voltage which is generated in the sound element 27 may be further provided. However, in exemplary embodiments, a structure of the amplifier is changed and driving as an amplifier and driving as a sensor 85 are performed in a time divisional manner so that one amplifier may also function as a pressure sensor.

Figure 17:
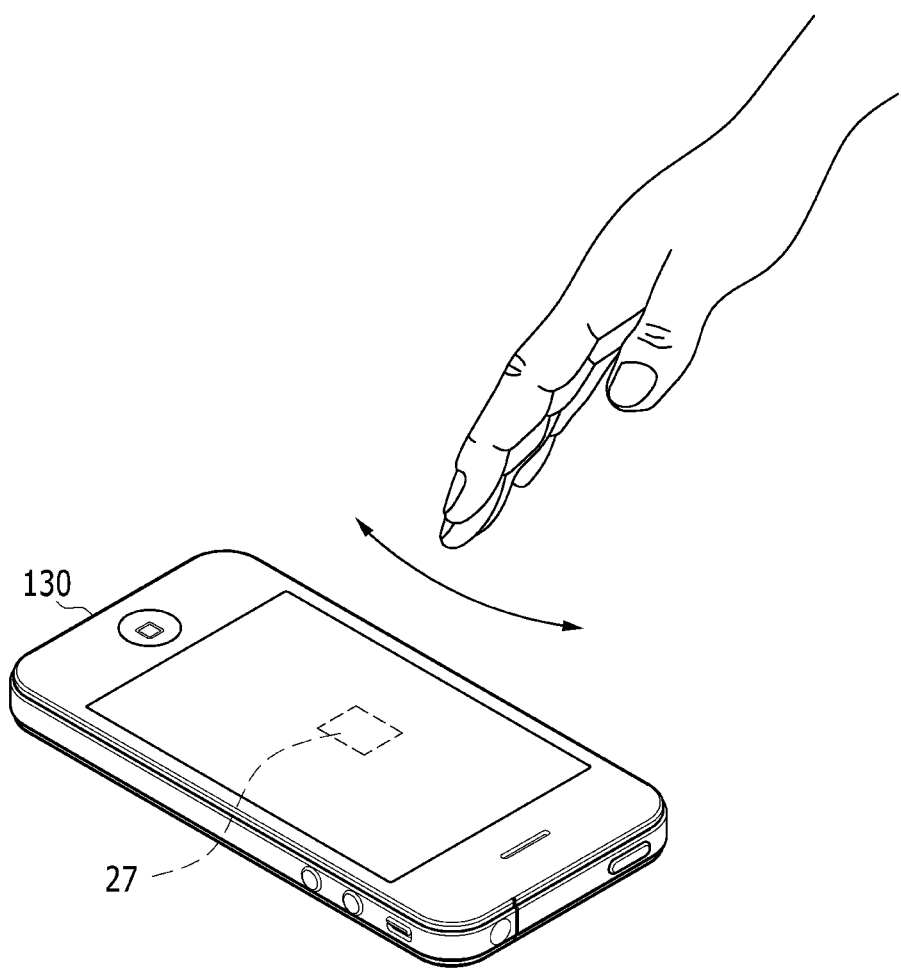
FIGS. 17 to 19 are diagrams illustrating an exemplary embodiment of a driving characteristic which may be used by a display device according to the invention.

FIG. 17 illustrates an exemplary embodiment in which motion of hands of the user is detected using a Doppler effect.

Figure 18:
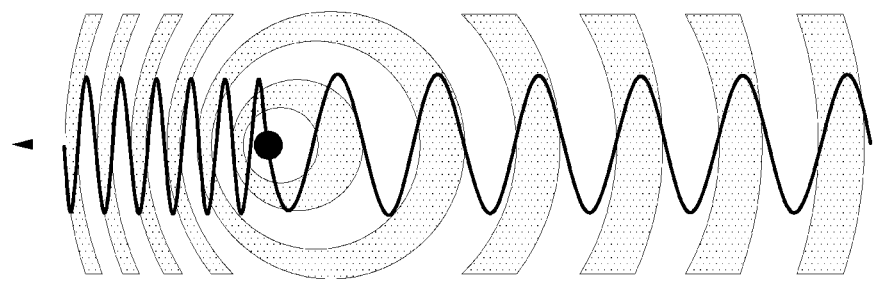

In a case that a sound wave of a high frequency or a low frequency which is not an audio frequency is generated in a sound element 27 which is disposed in a display device, when a user moves hands in front of the display device, the generated sound wave is changed to be input to a microphone 130 of a portable terminal. As illustrated in FIG. 18, the sound wave is transmitted to the microphone 130 while a sound pressure of the sound wave becomes strong or weak by the Doppler effect due to the motion of the hands of the user and the change of the sound wave which is provided to the microphone 130 is detected so that a motion-sensing function which detects the motion of the hands of the user is available in the display device.

In order to sense the motion using the sound element 27, the microphone 130 is necessary. When a display device including the sound element 27 is used for an electronic device including the microphone 130, the motion sensing is available without using a separate constituent element.

The motion sensing of FIG. 17 does not require an image processing using a camera as compared with motion sensing using a camera but needs to consider only a sound pressure which is input to the microphone 130. Therefore, the motion sensing of FIG. 17 is substantially simple.

Figure 19:
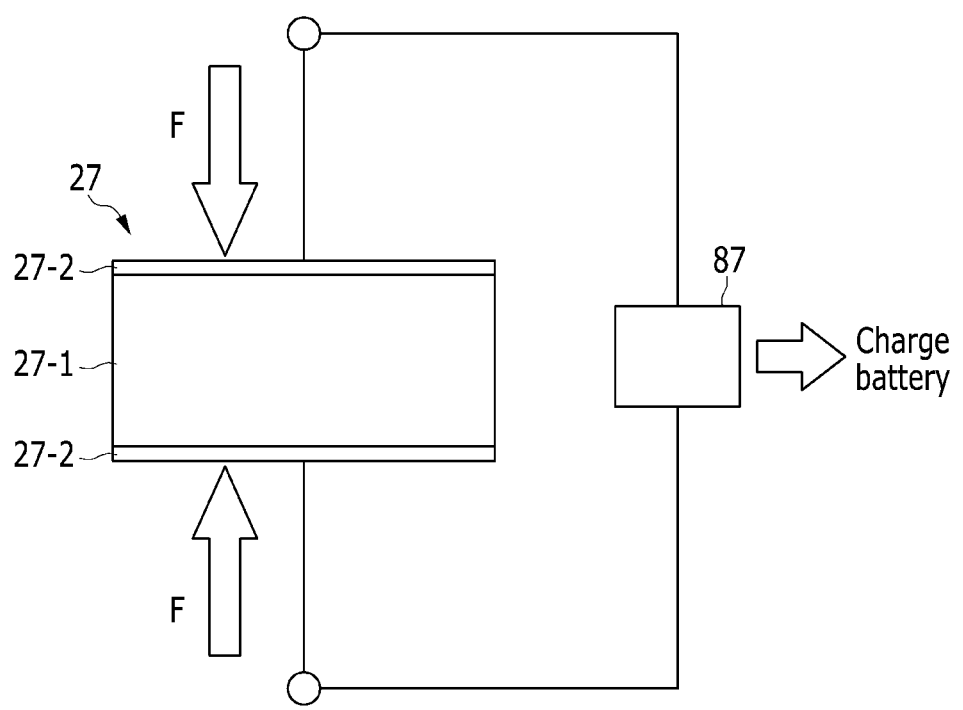

Hereinafter, battery charging of a portable terminal using a sound element 27 will be described with reference to FIG. 19.

As described with reference to FIG. 16, when the vibrating material layer 27-1 which is included in the sound element 27 vibrates without having an electric field, a voltage is generated from the vibrating material layer 27-1. The voltage generated as described above is stored in a capacitor or a battery 87 to increase a usage time of the battery. A portable terminal which is generally used is carried while the user moves so that the portable terminal is exposed to a predetermined level of vibration. Therefore, when the sound element 27 is included, the sound element 27 vibrates by itself to generate a voltage. The voltage may be transmitted to the battery 87 so as to charge the battery 87, such as in a charging function of the display device.

Further, when the portable terminal cannot be charged, the user shakes the portable terminal which includes the sound element 27 or touches the portable terminal several ten to several hundred times using a part of a body (e.g., fingers) or a device (e.g., a pen) to charge the battery 87 in a charging function of the display device.

As described above, another effect of the sound element 27 which has been described with reference to FIGS. 15 to 19 may be achieved by driving the sound element 27 in a time divisional manner while the sound element 27 provides a sound using one sound element 27. Further, a separate sound element 27 is further provided and the sound element 27 is not connected to the amplifier but is connected to a separate sensor or battery to perform only a detecting operation or a battery charging operation.

In the exemplary embodiments, even though it is described that the sound element 27 is disposed in the display device but the invention is not limited thereto, and in order to provide a characteristic of FIGS. 15 to 19, the sound element 27 may be disposed in somewhere of the portable terminal in which the display device is used but the sound element 27 is not necessarily disposed in the display device.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device, comprising:
 a display panel which displays an image;
 a cushion tape member which is disposed below the display panel to protect a rear surface of the display panel, and comprises a first cushion tape and a second cushion tape, and
 a sound element which is disposed between the first cushion tape and the second cushion tape, and comprises:
 a pair of electrodes; and
 a vibrating material layer disposed between the pair of electrodes,
 wherein:
 at least one of the first cushion tape and the second cushion tape includes at least one of a groove and an opening, and
 the vibrating material layer is disposed in one of the groove and the opening.

2. The display device of claim 1, wherein:
 the sound element further comprises a supporting portion extended from one of the pair of electrodes, and
 the supporting portion is disposed between the first cushion tape and the second cushion tape to support the sound element.

3. The display device of claim 2, wherein:
 the first cushion tape and the second cushion tape include grooves which provide resonators, and
 the vibrating material layer is disposed in one of the resonators.

4. The display device of claim 3, wherein:
 the sound element further comprises two or more vibrating material layers, and
 the two or more vibrating material layers are disposed in the one of the resonators.

5. The display device of claim 4, wherein:
the one of the pair of electrodes which defines the supporting portion is disposed below and commonly connected to the two or more vibrating material layers, and
the other of the pair of electrodes which does not define the supporting portion is disposed on the two or more vibrating material layers so as to be electrically isolated therefrom.

6. The display device of claim 3, wherein:
the first and second cushion tapes are adhesive members, and
adhesive is absent from the grooves so that the sound element is not attached to the grooves.

7. The display device of claim 2, wherein:
a first electrode of the pair of electrodes is disposed below the vibrating material layer,
a second electrode of the pair of electrodes is disposed above the vibrating material layer, and
the first electrode which is disposed below the vibrating material layer defines an electrode pad which extends to the upper portion through a side of the vibrating material layer.

8. The display device of claim 2, wherein:
the sound element generates a voltage by an external pressure applied to the display device, and
a pressure-detecting function of the display device evaluates the voltage to detect a pressure applied thereto.

9. The display device of claim 1, wherein:
the sound element further comprises two or more vibrating material layers, and
the two or more vibrating material layers are disposed in the opening.

10. The display device of claim 9, wherein:
the one of the pair of electrodes which define the supporting portion is disposed below and commonly connected to the two or more vibrating material layers, and
the other of the pair of electrodes which does not define the supporting portion is disposed on the two or more vibrating material layers so as to be electrically isolated therefrom.

11. A display device comprising:
a display panel which displays an image;
a cushion tape member which is disposed below the display panel to protect a rear surface of the display panel, and comprises a first cushion tape and a second cushion tape; and
a sound element which is disposed between the first cushion tape and the second cushion tape, and comprises:
a pair of electrodes; and
a vibrating material layer disposed between the pair of electrodes,
wherein:
the sound element further comprises three vibrating material layers including first to third vibrating material layers and four electrodes including first to fourth electrodes sequentially arranged from a top to a bottom in a vertical direction, and
each of the three vibrating material layers is arranged between adjacent electrodes of the four electrodes.

12. The display device of claim 11, wherein:
the fourth electrode which is disposed under the third vibrating material layer defines an electrode pad which extends from a side thereof and is disposed on the first vibrating material layer.

13. The display device of claim 12, wherein:
the first and third electrodes are electrically connected to each other,
the second and fourth electrodes are electrically connected to each other,
the first vibrating material layer is disposed between the first and second electrodes,
the second vibrating material layer is disposed between the second and third electrodes, and
the third vibrating material layer is disposed between the third and fourth electrodes.

14. A display device comprising:
a display panel which displays an image;
a cushion tape member which is disposed below the display panel to protect a rear surface of the display panel, and comprises a first cushion tape and a second cushion tape; and
a sound element which is disposed between the first cushion tape and the second cushion tape, and comprises:
a pair of electrodes; and
a vibrating material layer disposed between the pair of electrodes,
wherein:
the vibrating material layer of the sound element generates vibration of a frequency other than an audio frequency, and
a haptic function of the display device detects change in the frequency other than the audio frequency to detect a touch of a user.

15. A display device comprising:
a display panel which displays an image;
a cushion tape member which is disposed below the display panel to protect a rear surface of the display panel, and comprises a first cushion tape and a second cushion tape;
a sound element which is disposed between the first cushion tape and the second cushion tape, and comprises:
a pair of electrodes; and
a vibrating material layer disposed between the pair of electrodes; and
a microphone,
wherein
the vibrating material layer of the sound element generates a sound wave of a frequency other than an audio frequency, which is emitted from the sound element, and the sound wave is modulated by the Doppler effect in accordance with a motion of a user, relative to the display device, and
a motion-sensing function of the display device inputs the Doppler effect-modulated sound wave to the microphone, and a change in the inputted Doppler effect-modulated sound wave is detected to detect the motion of the user.

16. A display device comprising:
a display panel which displays an image;
a cushion tape member which is disposed below the display panel to protect a rear surface of the display panel, and comprises a first cushion tape and a second cushion tape;
a sound element which is disposed between the first cushion tape and the second cushion tape, and comprises:
a pair of electrodes; and
a vibrating material layer disposed between the pair of electrodes; and
a battery which supplies a power to the display device,
wherein
the sound element generates a voltage by an external pressure which is applied to the display device and vibrates the sound element, and a charging-function of the display device transmits the voltage generated by the sound element to the battery to charge the battery.

\* \* \* \* \*